(12) United States Patent
Yokoyama et al.

(10) Patent No.: US 12,331,524 B2
(45) Date of Patent: *Jun. 17, 2025

(54) CHARGE CONTROL SYSTEM, CHARGE CONTROL DEVICE, AND RECORDING MEDIUM

(71) Applicant: TOYOTA JIDOSHA KABUSHIKI KAISHA, Toyota (JP)

(72) Inventors: Daiki Yokoyama, Gotemba (JP); Daiki Kawachino, Shunto-gun (JP); Shota Tsukamoto, Susono (JP); Rie Yayabe, Susono (JP); Masaaki Sato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 877 days.

This patent is subject to a terminal disclaimer.

(21) Appl. No.: 17/507,062

(22) Filed: Oct. 21, 2021

(65) Prior Publication Data

US 2022/0149614 A1 May 12, 2022

(30) Foreign Application Priority Data

Nov. 11, 2020 (JP) .................. 2020-188166

(51) Int. Cl.
*E04D 13/10* (2006.01)
*H02H 7/18* (2006.01)

(52) U.S. Cl.
CPC .......... *E04D 13/103* (2013.01); *H02H 7/18* (2013.01)

(58) Field of Classification Search
CPC .... H02J 7/0047; H02J 7/0048; H02J 2203/20; H02H 7/18; E04D 13/103; F24S 40/20; G06Q 10/04; G02B 27/006

See application file for complete search history.

(56) References Cited

U.S. PATENT DOCUMENTS 6,051,812 A * 4/2000 Walker .................. H05B 3/36
219/548
6,420,978 B1 7/2002 Shinada et al.
(Continued)

FOREIGN PATENT DOCUMENTS

EP 3 751 466 A1 12/2020
JP 09-246822 A 9/1997
(Continued)

OTHER PUBLICATIONS

Office Action mailed Feb. 15, 2024, in co-pending U.S. Appl. No. 17/481,969.

(Continued)

*Primary Examiner* — Richard Isla
*Assistant Examiner* — Johali A Torres Ruiz
(74) *Attorney, Agent, or Firm* — Oblon, McClelland, Maier & Neustadt, L.L.P.

(57) ABSTRACT

A charge control system includes: a charging apparatus including a first processor to cause the charging apparatus to store electric power to be supplied to a preset region; a facility group installed in the region, to be supplied with electric power from the charging apparatus, and including a second processor; and a charge control device including a third processor configured to predict a snowfall amount in the region, calculate a snow removal electric power amount for removing snow covering the facility group based on the predicted snowfall amount, and perform charge control for causing the charging apparatus to store electric power equal to or more than the calculated snow removal electric power amount.

9 Claims, 2 Drawing Sheets

(56) References Cited

U.S. PATENT DOCUMENTS

| | | | |
|---|---|---|---|
| 8,078,330 | B2 | 12/2011 | Brickfield et al. |
| 8,666,666 | B2 | 3/2014 | Bassa |
| 8,798,852 | B1 | 8/2014 | Chen |
| 9,222,984 | B2 | 12/2015 | Iwasaki et al. |
| 9,321,364 | B1* | 4/2016 | Ashworth ............... H05B 3/28 |
| 9,387,772 | B2 | 7/2016 | Usuki et al. |
| 9,751,418 | B2 | 9/2017 | Nyu |
| 10,309,329 | B2 | 6/2019 | Tsunoda et al. |
| 11,015,542 | B2 | 5/2021 | Aoki et al. |
| 11,034,344 | B2 | 6/2021 | Endo |
| 11,214,166 | B2 | 1/2022 | Ono et al. |
| 11,339,734 | B2 | 5/2022 | Muta |
| 11,374,415 | B2 | 6/2022 | Schweitzer et al. |
| 11,433,871 | B2 | 9/2022 | Furuya |
| 11,668,481 | B2 | 6/2023 | Granger et al. |
| 11,868,144 | B2 | 1/2024 | Wake et al. |
| 12,024,044 | B2 | 7/2024 | Yokoyama et al. |
| 2006/0168951 | A1 | 8/2006 | Opris |
| 2006/0168952 | A1 | 8/2006 | Opris |
| 2008/0281732 | A1 | 11/2008 | Yamada |
| 2011/0202217 | A1 | 8/2011 | Kempton |
| 2013/0057211 | A1 | 3/2013 | Kuribayashi et al. |
| 2013/0213020 | A1 | 8/2013 | Ishikawa et al. |
| 2013/0218447 | A1 | 8/2013 | Mayinger |
| 2014/0253037 | A1 | 9/2014 | Yano et al. |
| 2015/0001201 | A1* | 1/2015 | Adler ............... H01L 31/024 320/101 |
| 2015/0039391 | A1 | 2/2015 | Hershkovitz |
| 2015/0134142 | A1 | 5/2015 | Taylor |
| 2018/0145873 | A1* | 5/2018 | Beattie, Jr. ............... H04L 43/08 |
| 2019/0360739 | A1* | 11/2019 | Brown ............... E01D 19/16 |
| 2020/0082041 | A1* | 3/2020 | Albert ............... G06F 30/27 |
| 2020/0139957 | A1 | 5/2020 | Muta |
| 2020/0231058 | A1 | 7/2020 | Hishida et al. |
| 2020/0403563 | A1* | 12/2020 | Stewart ............... B08B 13/00 |
| 2022/0005113 | A1 | 1/2022 | Kimura et al. |
| 2022/0091619 | A1 | 3/2022 | Wake et al. |
| 2022/0144119 | A1 | 5/2022 | Yokoyama et al. |
| 2022/0144124 | A1 | 5/2022 | Yokoyama et al. |
| 2022/0161674 | A1 | 5/2022 | Yokoyama et al. |
| 2022/0164721 | A1 | 5/2022 | Yokoyama et al. |
| 2022/0169136 | A1 | 6/2022 | Yokoyama et al. |
| 2023/0071267 | A1 | 3/2023 | Fujiwara et al. |

FOREIGN PATENT DOCUMENTS

| | | |
|---|---|---|
| JP | 2012-39706 A | 2/2012 |
| JP | 2013-69084 A | 4/2013 |
| JP | 2016-173689 A | 9/2016 |
| JP | 2018-025902 A | 2/2018 |
| JP | 2018-196231 A1 | 12/2018 |
| JP | 2019-21016 A | 2/2019 |

OTHER PUBLICATIONS

Notice of Allowance mailed May 28, 2024, in co-pending U.S. Appl. No. 17/481,969.

Mohamed Ghoneim et al., "Towards a Smart Sustainable City: Air Pollution Detection and Ctonrol using Internet of Things," Electronics and Communication Engineering, Canadian International College, $5^{th}$ International Con, pp. 1-6, (2019).

Murat Akein et al., "Opportunities for Energy Efficiency in Smart Cities," Inonu University and Bingol University, Departments of Electrical-Electronics Engineering and Physics, $4^{th}$ International Istanb, pp. 1-5, (2016).

U.S. Non-Final Office Action issued in U.S. Appl. No. 17/452,434 on Dec. 20, 2023.

U.S. Final Office Action issued in U.S. Appl. No. 17/452,434 on May 14, 2024.

Notice of Allowance mailed Aug. 9, 2024 in co-pending U.S. Appl. No. 17/481,969, 10 pages.

\* cited by examiner

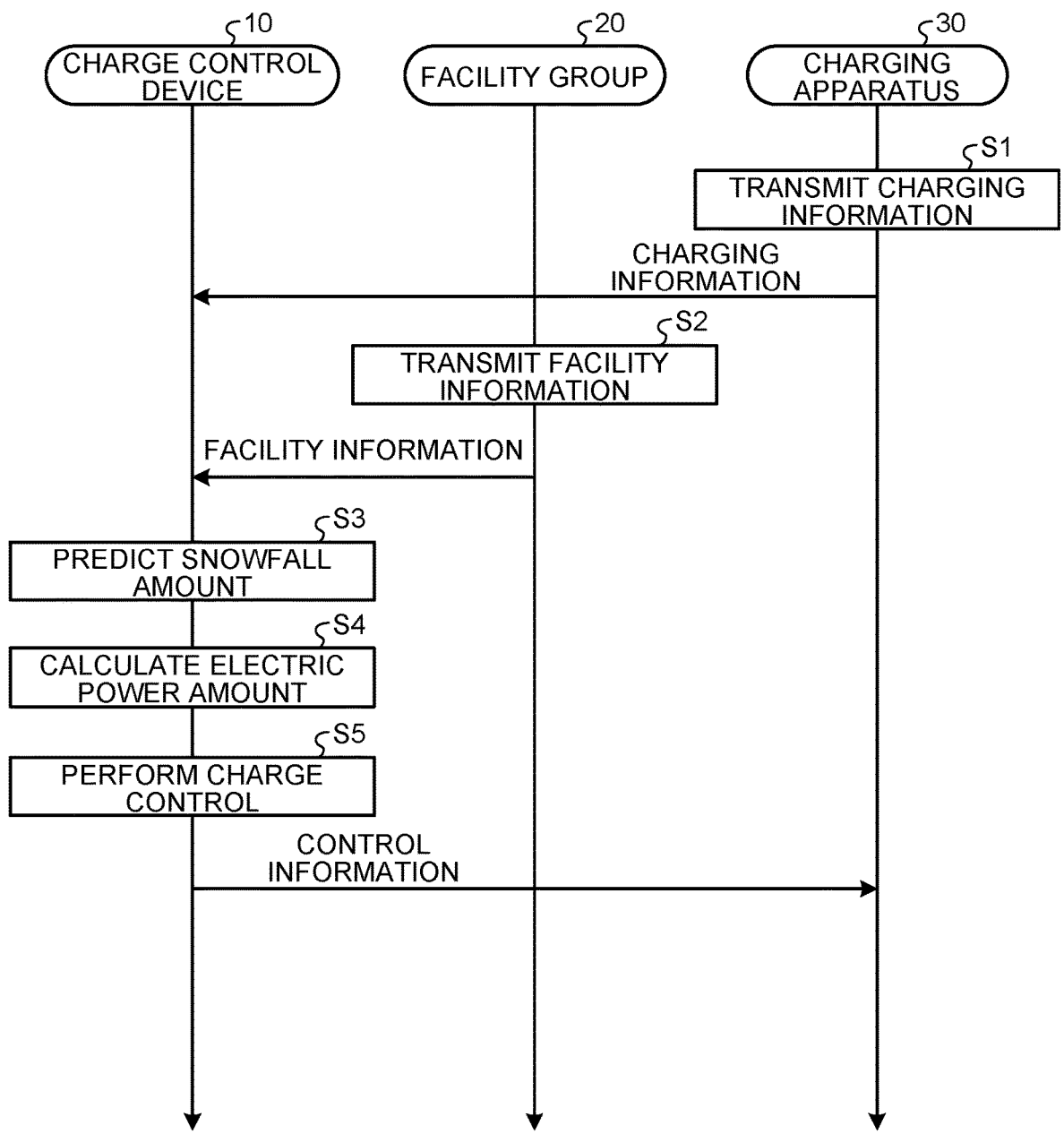

CHARGE CONTROL SYSTEM, CHARGE CONTROL DEVICE, AND RECORDING MEDIUM

CROSS-REFERENCE TO RELATED APPLICATION(S)

The present application claims priority to and incorporates by reference the entire contents of Japanese Patent Application No. 2020-188166 filed in Japan on Nov. 11, 2020.

BACKGROUND

The present disclosure relates to a charge control system, a charge control device, and a recording medium.

In a smart city, a technique for supplying electric power stored in a charging apparatus in advance to a facility group arranged in the city is known (for example, see Japanese Laid-open Patent Publication No. 2013-069084).

SUMMARY

There is a need for providing a charge control system, a charge control device, and a recording medium storing a charge control program capable of suppressing electric power shortage in snowfall in a smart city in advance.

According to an embodiment, a charge control system includes: a charging apparatus including a first processor configured to cause the charging apparatus to store electric power to be supplied to a preset region; a facility group installed in the region, to be supplied with electric power from the charging apparatus, and including a second processor; and a charge control device including a third processor to predict a snowfall amount in the region, calculate a snow removal electric power amount for removing snow covering the facility group based on the predicted snowfall amount, and perform charge control for causing the charging apparatus to store electric power equal to or more than the calculated snow removal electric power amount.

According to an embodiment, a charge control device including a processor to: predict a snowfall amount in a preset region; calculate a snow removal electric power amount for removing snow covering a facility group installed in the region based on the predicted snowfall amount; and perform charge control for causing a charging apparatus that supplies electric power to the region to store electric power equal to or more than the calculated snow removal electric power amount.

According to an embodiment, a non-transitory computer-readable recording medium storing a charge control program that causes a processor to: predict a snowfall amount in a preset region; calculate a snow removal electric power amount for removing snow covering a facility group installed in the region based on the predicted snowfall amount; and perform charge control for causing a charging apparatus that supplies electric power to the region to store electric power equal to or more than the calculated snow removal electric power amount.

BRIEF DESCRIPTION OF THE DRAWINGS

FIG. 2 is a flowchart illustrating an example of a charge control method performed by the charge control system according to the embodiment.

DETAILED DESCRIPTION

Figure 1:
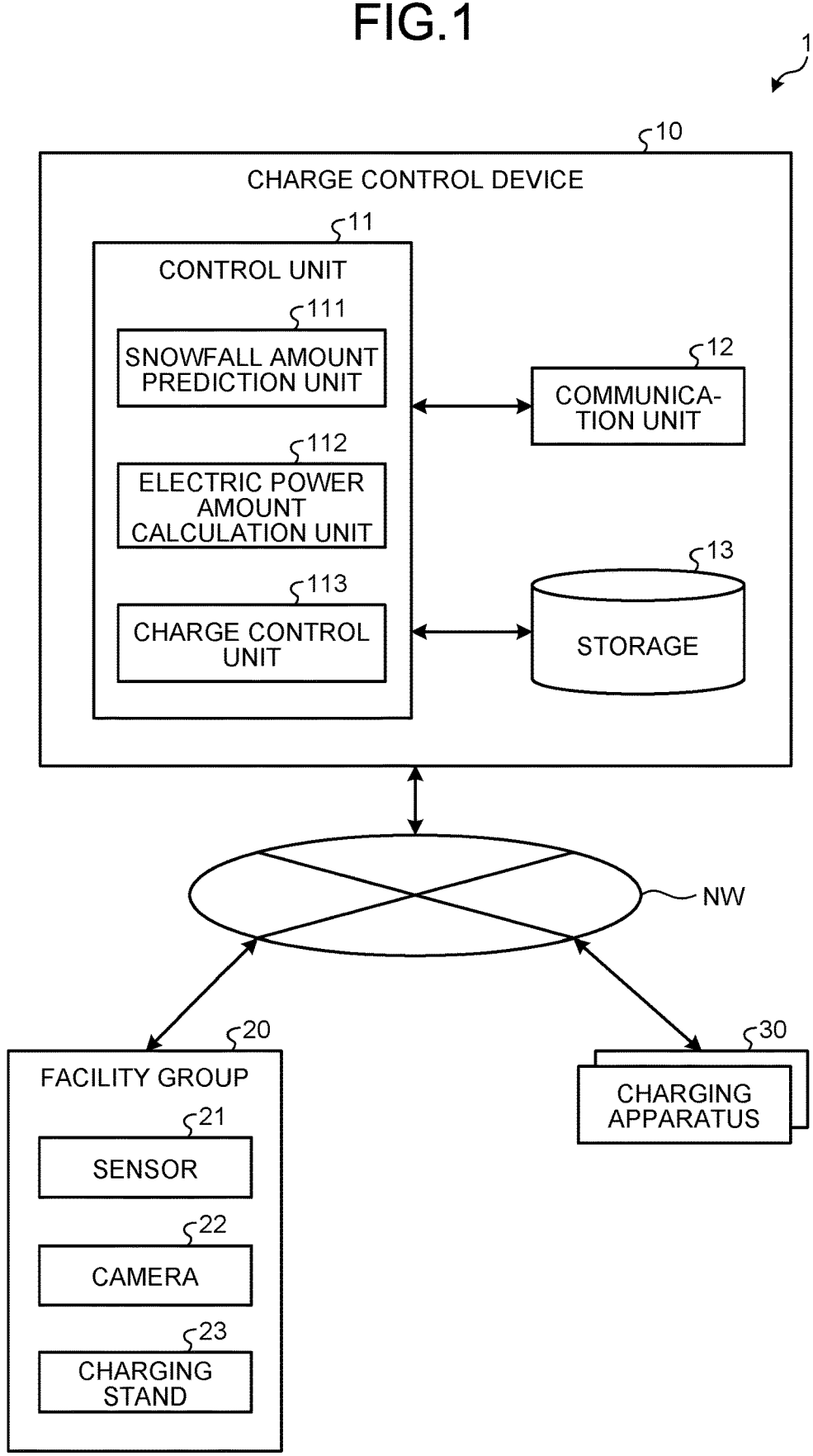
FIG. 1 is a block diagram illustrating details of each component of a charge control system according to an embodiment.

In the related art, if snow covers a facility group (sensor, camera, charging stand, etc.) installed in a smart city during snowfall, malfunction may occur. Therefore, it is necessary to use the electric power stored in the charging apparatus for removing snow covering the facility group. However, in snowfall, the electric power consumption is more than usual due to increase in use of a heater or the like. Therefore, there has been a demand for a technique capable of suppressing electric power shortage during snowfall in advance.

A charge control system, a charge control device, and a charge control program according to an embodiment of the present disclosure will be described with reference to the drawings. The components in the following embodiment include those that can be easily replaced by those skilled in the art, or those that are substantially the same.

Charge Control System

A charge control system including a charge control device according to the embodiment will be described with reference to FIG. 1. The charge control system is for performing charge control for a charging apparatus that supplies electric power to a preset region. The "preset region" is a region where a large number of users live or what a large number of users use, and examples thereof include a smart city, a theme park, a leisure land, and the like. In the present embodiment, a description will be given assuming that this region is a smart city.

As illustrated in FIG. 1, a charge control system 1 includes a charge control device 10, a facility group 20, and a plurality of charging apparatuses 30. The charge control device 10, the facility group 20, and the charging apparatuses 30 all have a communication function, and are configured to be able to communicate with each other through a network NW. The network NW includes, for example, the Internet line network, a mobile phone line network, and the like.

Charge Control Device

The charge control device 10 is provided inside the smart city or outside the smart city. This charge control device 10 is implemented by, for example, a general-purpose computer such as a workstation or a personal computer, for example.

As illustrated in FIG. 1, the charge control device 10 includes a control unit 11, a communication unit 12, and a storage 13. Specifically, the control unit 11 includes a processor including a central processing unit (CPU), a digital signal processor (DSP), or a field-programmable gate array (FPGA), and a memory (main storage) including a random access memory (RAM), a read only memory (ROM), or the like.

The control unit 11 loads a program stored in the storage 13 into the work area of the main storage, executes the program, and controls each of the components and the like through the execution of the program to implement functions that meet a predetermined purpose. The control unit 11 functions as a snowfall amount prediction unit 111, an electric power amount calculation unit 112, and a charge control unit 113 through execution of a program stored in the storage 13.

The snowfall amount prediction unit 111 predicts a snowfall amount in a preset region (hereinafter, referred to as a "smart city"). A specific prediction method of the snowfall amount performed by the snowfall amount prediction unit 111 is not particularly limited, and various prediction methods can be used.

The snowfall amount prediction unit 111 can collect pieces of weather information from, for example, a server (weather server) or the like provided in the Japan Meteorological Agency or the like, and predict a snowfall amount at the time or in the future in the smart city based on the weather information. Furthermore, the snowfall amount prediction unit 111 may predict a snowfall amount at the time or in the future in the smart city using a prediction model created in advance by machine learning based on the past snowfall amount data. Furthermore, the snowfall amount prediction unit 111 may predict a snowfall amount at the time or in the future in the smart city based on a detection value by a weather sensor or the like disposed in the smart city. Note that the snowfall amount prediction unit 111 may predict a snowfall amount of at least at a place where the facility group 20 is disposed in the smart city.

The electric power amount calculation unit 112 calculates an electric power amount (hereinafter, referred to as "snow removal electric power amount") for removing snow covering the facility group 20 based on the snowfall amount predicted by the snowfall amount prediction unit 111. Examples of the "snow removal electric power amount" include electric power supplied to a snow melting heater buried in a road surface in the smart city, electric power for driving a snow removal vehicle, and the like.

In addition, the electric power amount calculation unit 112 may predict an amount of snow covering the facility group 20 to be melted, and calculate the snow removal electric power amount in consideration of the predicted amount to be melted in addition to the snowfall amount predicted by the snowfall amount prediction unit 111. The amount of snow covering the facility group 20 to be melted can be predicted based on, for example, information included in the weather information such as temperature and air volume in the smart city. As described above, by considering not only the snowfall amount in the smart city but also the amount of snow to be melted after the snowfall, the snow removal electric power amount can be calculated more accurately. Therefore, the electric power to be stored in the charging apparatuses 30 can be optimized, and it is possible to suppress excessive electric power from being stored in the charging apparatuses 30.

In addition, the electric power amount calculation unit 112 may calculate the snow removal electric power amount in consideration of the number (scale) of facilities in which malfunction has occurred in the smart city. In this case, the electric power amount calculation unit 112 first acquires facility information from the facility group 20, and identifies equipment in which malfunction has occurred due to snow covering the equipment out of the facility group 20 based on the facility information. Note that the "facility information" indicates, for example, operating states of a sensor 21, a camera 22, and a charging stand 23 included in the facility group 20, that is, information indicating whether each facility is operating normally.

Subsequently, the electric power amount calculation unit 112 calculates the snow removal electric power amount based on the number of facilities in which malfunction has occurred and the snowfall amount predicted by the snowfall amount prediction unit 111. As described above, the snow removal electric power amount can be more accurately calculated by specifying a facility in which malfunction actually occurs due to the snowfall out of the facility group 20. Therefore, the electric power to be stored in the charging apparatuses 30 can be optimized, and it is possible to suppress excessive electric power from being stored in the charging apparatuses 30.

The charge control unit 113 performs charge control for the charging apparatuses 30 based on the electric power amounts calculated by the electric power amount calculation unit 112. The charge control unit 113 performs charge control for causing the charging apparatuses 30 to store the electric power equal to or more than the snow removal electric power amount calculated by the electric power amount calculation unit 112. A specific method of the charge control by the charge control unit 113 is not particularly limited, and for example, the charge control unit 113 may perform the charge control by determining the charge amount by the electric power amount calculation unit 112 based on the snow removal electric power amounts calculated at predetermined periods and charging information acquired in advance from the charging apparatuses 30 (for example, charge capacity at the time, etc.), and transmitting a command to set the charge amount at the time or in the future to be larger or smaller to the charging apparatuses 30 according to the charge amount.

The communication unit 12 includes, for example, a local area network (LAN) interface board, a wireless communication circuit for wireless communication, and the like. The communication unit 12 is connected to the network NW such as the Internet, which is a public communication network. The communication unit 12 communicates with the facility group 20 and the charging apparatuses 30 by connecting to the network NW.

The storage 13 includes a recording medium such as an erasable programmable ROM (EPROM), a hard disk drive (HDD), and a removable medium. Examples of the removable medium include a disc recording medium such as a universal serial bus (USB) memory, a compact disc (CD), a digital versatile disc (DVD), and a Blu-ray (registered trademark) disc (BD). The storage 13 can store an operating system (OS), various programs, various tables, various databases, and the like. In addition, for example, the snowfall amount predicted by the snowfall amount prediction unit 111, the snow removal electric power amount calculated by the electric power amount calculation unit 112, the charge amounts of the charging apparatuses 30 determined by the charge control unit 113, and the like are stored in the storage 13 as necessary.

Facility Group

The facility group 20 is a plurality of types of facilities installed at a predetermined place in the smart city, and operates by electric power supplied from the charging apparatuses 30. Examples of the facility group 20 include the sensor (human sensor, weather sensor, etc.) 21, the camera (a monitoring camera, etc.) 22 used for collecting pieces of information in the smart city, the charging stand (contact charging stand or non-contact charging stand) 23 for an electric vehicle and a plug-in hybrid vehicle, and the like. In addition, the facility group 20 may also include lighting, traffic signals, and the like disposed in the smart city. In addition, the facility group 20 transmits facility information indicating the operating state of the facility group 20 to the charge control device 10 occasionally or at predetermined periods.

Charging Apparatus

The charging apparatuses 30 are for storing electric power to be supplied to the facility group 20, and are provided inside or outside the smart city. These charging apparatuses 30 each are implemented by, for example, a general-purpose computer such as a workstation or a personal computer. In addition, the charging apparatuses 30 each incorporate a battery for storing electric power, a control mechanism for controlling charging and discharging of electric power, and the like. In addition, the charging apparatuses 30 transmit charging information regarding the charging apparatuses 30 at the time to the charge control device 10 occasionally or at predetermined periods.

Charge Control Method

An example of a processing procedure of the charge control method performed by the charge control system 1 according to the embodiment will be described with reference to FIG. 2.

First, the charging apparatuses 30 transmit charging information to the charge control device 10 (step S1). Subsequently, the facility group 20 transmits the facility information to the charge control device 10 (step S2). Note that the order of steps S1 and S2 may be reversed.

Subsequently, the snowfall amount prediction unit 111 of the charge control device 10 predicts a snowfall amount in the smart city based on weather information, a detection value of a weather sensor, and the like (step S3). Subsequently, the electric power amount calculation unit 112 calculates a snow removal electric power amount based on the snowfall amount in the smart city and the facility information (step S4). Subsequently, the charge control unit 113 performs charge control for the charging apparatuses 30 based on the electric power amount calculated in step S4 (step S5). Thus, the processing of the charge control method is completed.

As described above, according to the charge control system, the charge control device, and the charge control program according to the embodiment, it is possible to suppress electric power shortage in snowfall in the smart city.

That is, when it snows in the smart city, snow may cover the facility group 20 installed in the smart city, and an operation abnormality may occur. Therefore, it is conceivable to melt snow by using a snow melting heater buried in a road surface in the smart city or a snow removal vehicle. However, there is a possibility that electric power consumption peaks due to the use of heaters in general homes and various facilities, so that electric power for operating the snow melting heater or the snow removal vehicle becomes insufficient.

On the other hand, according to the charge control system, the charge control device, and the charge control program according to the embodiment, the snow removal electric power amount is calculated based on the predicted snowfall amount, and the charge control for the charging apparatuses 30 is performed based on the snow removal electric power amount, so that electric power shortage does not occur in snowfall. In addition, according to the charge control system, the charge control device, and the charge control program according to the embodiment, it is possible to secure electric power for melting snow covering the facility group 20, and thus, it is possible to suppress an operation abnormality of the facility group 20.

Furthermore, according to the charge control system, the charge control device, and the charge control program according to the embodiment, the charge control is performed such that more electric power than consumed is not stored in the charging apparatuses 30. Thus, waste of electric power and deterioration of the battery can be suppressed.

According to the present disclosure, electric power shortage in snowfall in a smart city can be suppressed in advance.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A charge control system comprising:
   a charging apparatus including a first processor configured to cause the charging apparatus to store electric power to be supplied to a preset region;
   a facility group installed in the preset region, configured to be supplied with electric power from the charging apparatus, and including a second processor; and
   a charge control device including a third processor configured to predict a snowfall amount in the preset region, calculate a snow removal electric power amount for removing snow covering the facility group based on the predicted snowfall amount, and perform charge control for causing the charging apparatus to store electric power equal to or more than the calculated snow removal electric power amount.

2. The charge control system according to claim 1, wherein the third processor predicts an amount of snow covering the facility group to be melted, and calculates the snow removal electric power amount in consideration of the predicted amount of snow to be melted.

3. The charge control system according to claim 1, wherein
   the second processor outputs facility information indicating an operating state of the facility group to the charge control device, and
   the third processor is configured to
      specify at least one facility in which malfunction has occurred due to snow covering the facility group out of the facility group based on the facility information, and
      calculate the snow removal electric power amount in consideration of the number of the facilities in which the malfunction has occurred.

4. A charge control device including a processor configured to:
   predict a snowfall amount in a preset region;
   calculate a snow removal electric power amount for removing snow covering a facility group installed in the preset region based on the predicted snowfall amount; and
   perform charge control for causing a charging apparatus that supplies electric power to the preset region to store electric power equal to or more than the calculated snow removal electric power amount.

5. The charge control device according to claim 4, wherein the processor predicts an amount of snow covering the facility group to be melted, and calculates the snow removal electric power amount in consideration of the predicted amount of snow to be melted.

6. The charge control device according to claim 4, wherein the processor is configured to
   acquire facility information indicating an operating state of the facility group from the facility group,
   specify at least one facility in which malfunction has occurred due to snow covering the facility group out of the facility group based on the facility information, and calculate the snow removal electric power amount in consideration of the number of the facilities in which the malfunction has occurred.

7. A non-transitory computer-readable recording medium storing a charge control program that causes a processor to:
predict a snowfall amount in a preset region;
calculate a snow removal electric power amount for removing snow covering a facility group installed in the preset region based on the predicted snowfall amount; and
perform charge control for causing a charging apparatus that supplies electric power to the preset region to store electric power equal to or more than the calculated snow removal electric power amount.

8. The non-transitory computer-readable recording medium storing the charge control program according to claim 7 that causes the processor to
predict an amount of snow covering the facility group to be melted, and calculate the snow removal electric power amount in consideration of the predicted amount of snow to be melted.

9. The non-transitory computer-readable recording medium storing the charge control program according to claim 7 that causes the processor to
acquire facility information indicating an operating state of the facility group from the facility group,
specify at least one facility in which malfunction has occurred due to snow covering the facility group out of the facility group based on the facility information, and
calculate the snow removal electric power amount in consideration of the number of the facilities in which the malfunction has occurred.

* * * * *